W. E. McLEAN & T. C. COULL.
FILE AND BINDER.
APPLICATION FILED JULY 15, 1914.

1,150,442.

Patented Aug. 17, 1915.
4 SHEETS—SHEET 1.

WITNESSES:
John C. Sanders
Albert F. Heuman

INVENTORS:
William Ellison McLean
Thomas Charles Coull
BY Wm Wallace White
ATTY.

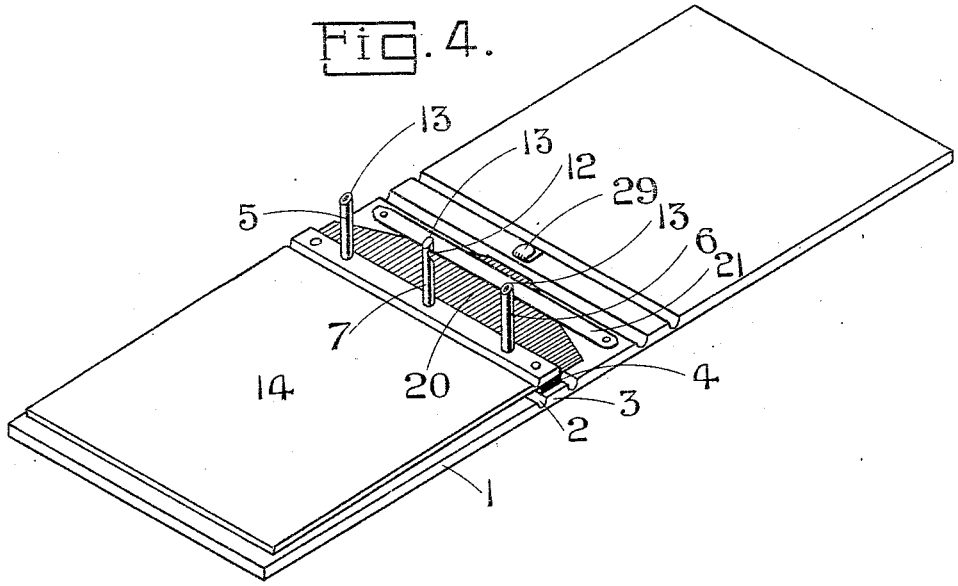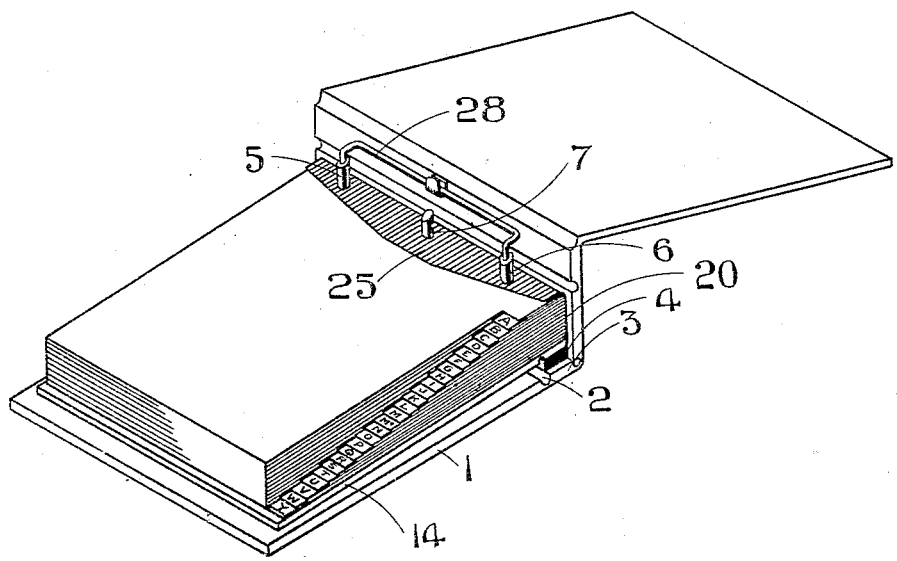

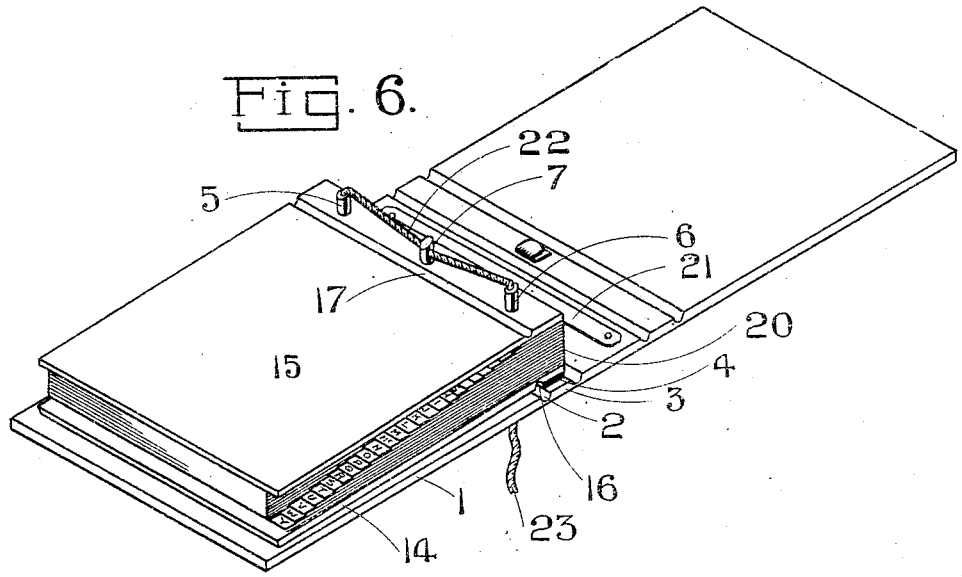
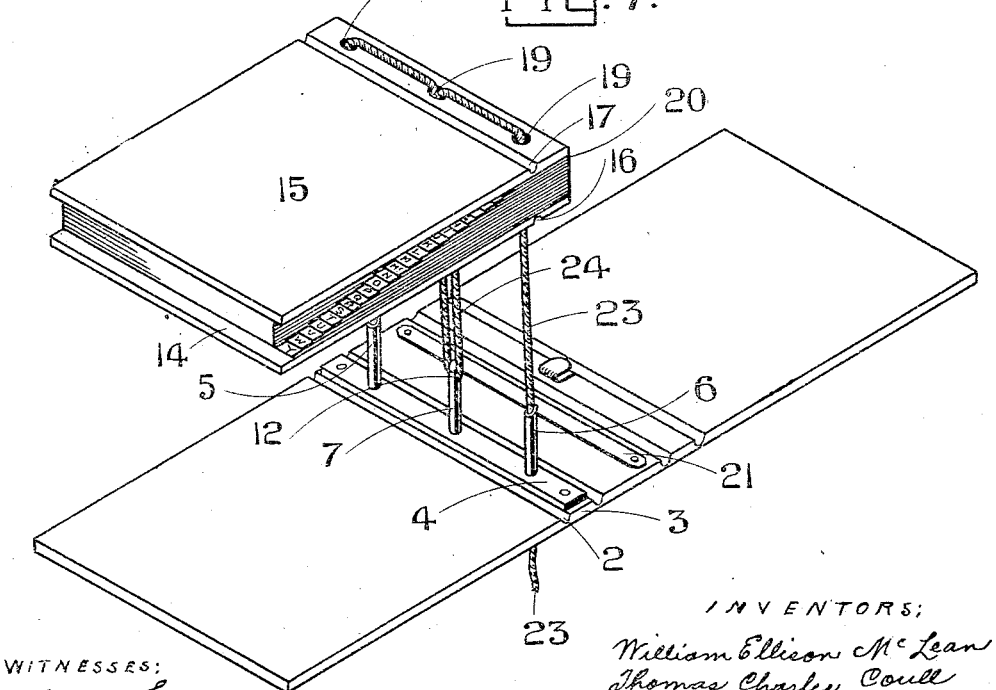

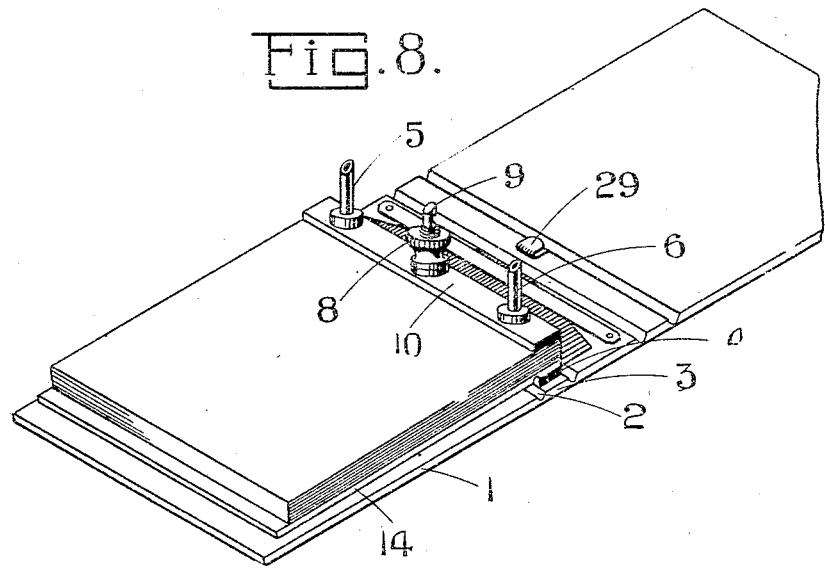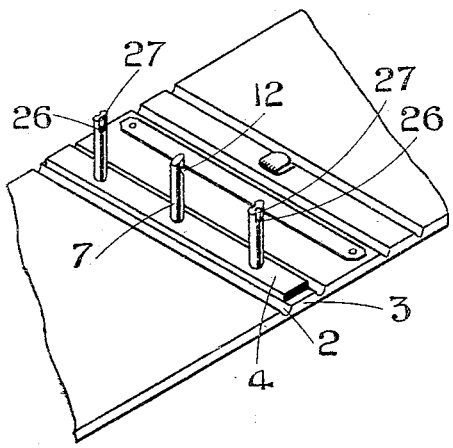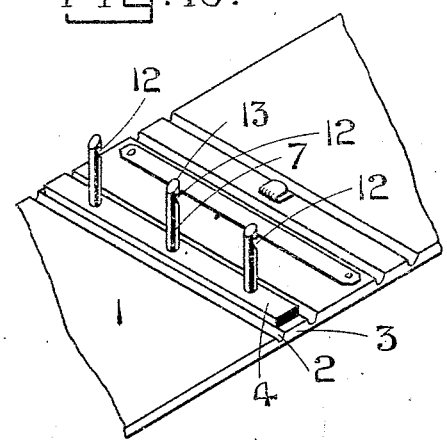

UNITED STATES PATENT OFFICE.

WILLIAM ELLISON McLEAN AND THOMAS CHARLES COULL, OF DUNEDIN, NEW ZEALAND.

FILE AND BINDER.

1,150,442. Specification of Letters Patent. Patented Aug. 17, 1915.

Application filed July 15, 1914. Serial No. 851,108.

*To all whom it may concern:*

Be it known that we, WILLIAM ELLISON McLEAN and THOMAS CHARLES COULL, both subjects of the King of Great Britain, residing at Dunedin, New Zealand, have invented certain new and useful Improvements in Files and Binders, of which the following is a specification.

This invention relates to files for invoice sheets, letters, vouchers, plans, newspapers and the like and binders for use therewith, the object of the invention being to provide a simple and efficient file and binder which will be compact and of good appearance, self-adjustable for binding different quantities of sheets, and whereby the sheets can be removed from a filled file and bound together rapidly and effectively, and which in the case of a book-shaped file will open out flat to enable inspection of the contents.

Figure 1:
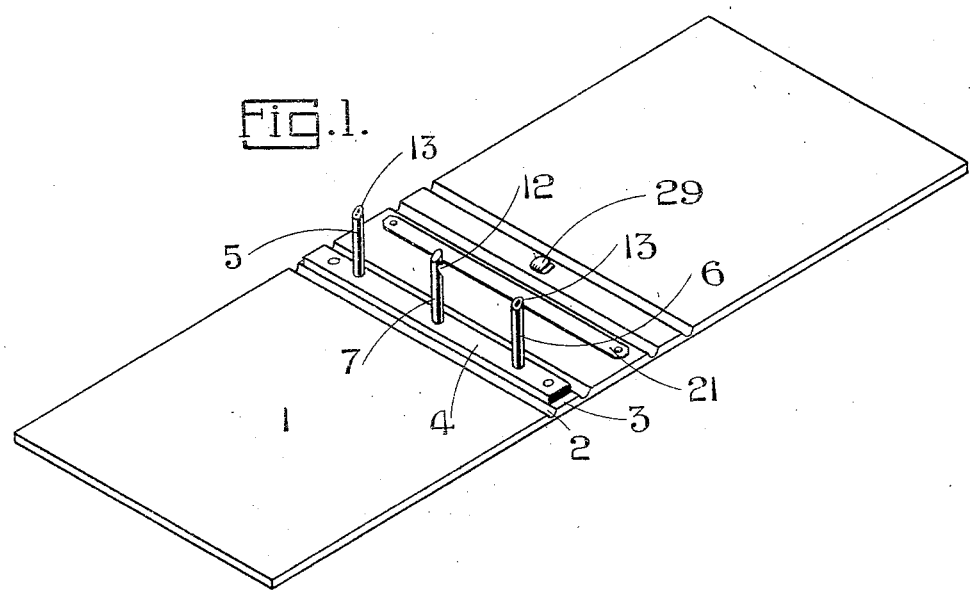
Figure 2:
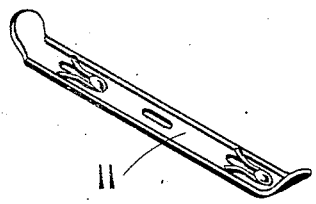
Figure 3:
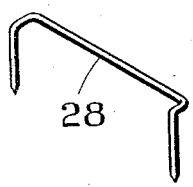

In the accompanying drawings illustrating the invention Figure 1 is a view of the file opened out with spring clip and wire lifter removed. Fig. 2 is a view of a suitable spring clip. Fig. 3 is a view of a suitable wire lifter. Fig. 4 is a view of the file opened out ready for use, spring clip and wire lifter removed, and bottom cover of binder placed in position. Fig. 5 is a view of the file with sheets filed thereon ready for binding, the flexible back of the binder cover having been turned up and passed down over the pillars. In this view the wire lifter is also (for convenience of illustration) shown in position, although in practice it would be removed. Fig. 6 is a view of the file showing the top cover of the binder in position and the cord in position ready for lifting the binder and its contents off the file. Fig. 7 is a view of the file showing the binder and its contents lifted off the file and the position of the cord. Fig. 8 is a view of the file showing an alternative form of locking clip. Figs. 9 and 10 are detail views of part of the file showing two alternative constructions of the pillars.

The file may be made in any suitable form, either as a wall file fitted with a loop or the like to hang upon a wall, or as a book shaped file with back and front covers made integral with the backpiece, the latter form being the one illustrated in the accompanying drawings. The back cover 1 is preferably made of wood, strawboard, leatherboard or the like, and it may (except in the case of a wooden-back wall file) be scored or creased as at 2 from side to side near its rear edge so as to leave a narrow strip 3 at the edge of said cover that can bend back freely. Riveted or otherwise suitably secured to said strip 3 there is a flat plate 4 carrying two hollow pillars 5, 6 one at each end of the plate 4 and a suitable distance apart, which are secured to and extend down through the plate 4, and to holes respectively pierced through the strip 3 so as to form a through passage for a cord or string as hereinafter described. Secured to the plate, and projecting upward therefrom there are also one, two or more intermediate pillars, which in the case of one pillar 7 is located midway between and in line with the two hollow pillars 5, 6 before mentioned and in the case of two or more pillars are spaced at equal distances between and in line with the said two hollow pillars. These intermediate pillars need not be hollow.

A spring locking clip 11 of suitable design such as shown in Fig. 2 is employed working on the pillars 5, 6, 7 and adapted to bind in position sheets placed on the pillars. It will be observed that the spring locking clip 11 shown in Fig. 2 of the drawings consists of a plate having upturned ends and three spaced longitudinal slots adapted to receive the pillars 5, 6 and 7, the outer slots or openings therein being provided with the usual form of spring clips to frictionally engage the outer pillars in order to hold down the papers in a manner common in this art. Near the top end and at the back of each intermediate pillar 7 there is a hook shaped notch 12 formed, adapted to engage a cord as hereinafter described. If desired, these intermediate pillars 7 may be made hollow, for the same purpose as the outer pillars 5, 6 before described, in which case the hook 12 is formed by cutting a notch in one side of the pillar or cutting out and bending down a portion of the wall of the pillar. The backpiece of the file is made of the size required according to the size of sheets or the like to be filed on it, and the latter sheets before being filed are punched with suitable holes to pass over the pillars 5, 6, 7 and are placed on the file from time to time and secured by the spring clip 11 as before mentioned. All the pillars have their upper edge sharpened to act as piercers, the rear edges 13 of the pillars formed to a point being higher than their front edges which are cut away somewhat.

The binder for use with the file comprises two auxiliary covers 14, 15 of almost the same size as the back cover of the file, both of which auxiliary covers are creased or scored 16, 17 and have holes 19 punched in their scored ends adapted to pass over the pillars 5, 6, 7 on the backpiece. The bottom cover 14 has one edge of a flexible back 20 secured to its creased end, the flexible back 20 being of sufficient width to provide for different quantities of sheets, the adjustability of this flexible back to bind neatly varying quantities of sheets as hereinafter described being a feature of this invention. The bottom cover 14 is placed on the file (see Fig. 4) before any sheets are placed thereon, the flexible back 20 being turned back and slipped under a strip 21 of tin or the like behind the backpiece of the file or otherwise secured conveniently out of the way as by a loop of elastic or the like. The sheets are then filed as usual (with an index if required) on top of the cover 14 until the file has been filled as far as desired whereupon the spring clip 11 or the like is removed, and the fingers of the user are inserted under the cover 14 which with the sheets resting on it is lifted up on the pillars until the top sheet is just below the top of the pillars, in which position the sheets are held by one hand. With the other hand of the user the flexible back 20 is then drawn from under the strip 21 pulled forward and its free edge pulled taut around and over the backs of the filed sheets and pressed down on to the sharpened tops 13 of the pillars 5, 6, 7 these piercing the said free edge which is then passed down on to the pillars as shown in Fig. 5, and the bundle of sheets thus neatly inclosed in the back of the binder, are released from the hand. The outer cover 15 is then passed on to the pillars on top of the said flexible back 20 thus inclosing the sheets between the two covers of the binder as shown in Fig. 6. A piece of cord 22 or the like is then taken and its two ends 23 passed respectively one through each of the hollow pillars 5, 6 down through the backpiece of the file. The intermediate part of the cord is passed under and held by the hook-shaped notch 12 in each of the pillars 7. The notches 12 in intermediate pillars are made so as to retain the cord, and may be of any suitable shape for the purpose. The binder with sheets therein is then lifted up off the pillars (see Fig. 7) thereby drawing the sheets on to the cord 22, the ends 23 of the cord coming out respectively through the holes in the sheets that passed over the end hollow pillars 5, 6 and an intermediate loop 24 appearing beneath each hole that passed over an intermediate pillar 7. These loops 24 are then disengaged from the hooks 12 and the ends of the cord 22 are passed through the loops and laced or tied up so as to secure the whole and bind the cover and sheets securely. The free end 25 of the flexible back 20 may be gummed so that it can be fastened to the top cover 15 of the binder. The binder and contents being thus removed from the file a fresh cover 14 is placed in position on the latter and the operation repeated.

Instead of having the two end pillars hollow, they may be made solid (see Fig. 9) with a transverse hole 26 pierced in their upper end, grooves 27 being made above the hole to allow free running of the cord. With this construction the binding cord is passed across through the holes 26 in the two end pillars, and under the notches 12 in the intermediate pillars and after the covering sheets and their contents have been lifted off the ends of the cord are pulled down through the end holes in the sheets and laced up through the loops as before described.

In a further modification, instead of having the end pillars hollow, or solid with transverse holes at their upper ends, they may be made solid (see Fig. 10) and with hook shaped notches 12 in them like the intermediate pillars. With this construction the cord is passed under the hooked notches in the end pillars and the intermediate pillars and after the covering sheets and their contents have been lifted the ends of the cord are pulled down through the end holes of the sheets and laced up as before described.

It will be seen that any size of sheet or newspaper or the like can be filed and bound by means of this invention, by increasing the number of intermediate pillars.

A wire lifter 28 of usual type (see Fig. 3) can be used in conjunction with the file when hollow end pillars 5, 6 are employed, a clip 29 being provided to engage the lifter 28 on the back of the file.

Instead of the spring locking clip illustrated in Fig. 2, one or more of the solid pillars 9 may be externally threaded see Fig. 8 to take a thumb nut or nuts which works up and down on the pillar and is connected to a flat plate 10 formed with holes and bosses to pass over and slide on the pillars 5, 6, 9. This plate 10 is by means of the thumbnut 8 clamped upon the sheets in the file so as to hold them in position.

It will be obvious that instead of hooked intermediate pillars 7, these pillars may be made the same as the outer pillars 5, and when it is desired to remove the contents from the file loops are made in the intermediate portion of the string, a loop being passed down each intermediate pillar through the backpiece and held while the sheets are lifted off, and the ends of the cord can thereafter be laced up through the loops. This method is rather awkward however, and it is preferred to provide the intermediate pillars with cord-engaging means as hereinbefore described.

Having now described our said invention, we declare that what we claim is:—

1. In a file, a back cover, pillars mounted thereon, a binder comprising an auxiliary cover perforated at its edge to pass over said pillars, said pillars having passages therethrough and said back cover having a hole therein under each of said pillars, and a flexible back attached at one end to said auxiliary cover to bind sheets between it and the auxiliary cover, substantially as and for the purpose set forth.

2. In a file, a backpiece, two pillars mounted thereon, said pillars having passages therethrough and said backpiece having a hole therein under each of said pillars, and an intermediate pillar between said first mentioned pillars, said intermediate pillar being provided with means for temporarily engaging a cord in the upper end of each substantially as and for the purpose set forth.

3. In a file, a back cover, a plurality of pillars mounted thereon, said pillars having passages therethrough and said back cover having a hole therein under each of said pillars and alining with said passages continuously and an intermediate pillar between said first mentioned pillars, said intermediate pillar being provided with means formed at its upper end adapted to temporarily engage a cord for binding sheets by removal from said pillars.

4. In a file, a back cover, two pillars mounted thereon, said pillars having passages therethrough and said back cover having a hole therein under each of said pillars, auxiliary covers for application to said pillars, and an intermediate pillar between said first mentioned pillars, one of said auxiliary covers having a flexible extension adapted to be bent for forming a binding and engaged over the other auxiliary cover to be pierced by said pillars, said intermediate pillar being provided with means for temporarily engaging a cord in its upper end, whereby said cord may be drawn through the sheets between the auxiliary covers for binding the same to the latter substantially as and for the purpose set forth.

5. In a file, a back piece, pillars mounted thereon and a binder-cover perforated at its edge to pass over said pillars, and a flexible back attached at one end to said cover and adapted to be passed over said pillars whereby the same is pierced and held against displacement.

6. In a file, a back cover, pillars mounted thereon, an auxiliary binder cover on said pillars having a flexible back attached to it at one end, and a second binder cover on said pillars, both of said latter covers being scored and perforated at one edge and said flexible back being adapted to be passed over said pillars to be pierced thereby, whereby to form a binding when said auxiliary binder covers are secured together.

7. A file comprising a backpiece, pillars mounted thereon, and a binder-cover on said pillars having a flexible back attached, said flexible back being adapted after a desired number of sheets have been filed on said pillars above said cover to be drawn forward on to and pierced to pass over said pillars and drawn down so as to closely fit around the ends of the filed sheets, substantially as and for the purpose set forth.

8. A file comprising a back cover and pillars mounted thereon adapted to receive the sheets perforated to suit certain of said pillars being adapted to temporarily engage a cord placed across them above such sheets in such a way that on lifting the sheets off the pillars the cord will be drawn through the perforations in the sheets into a position ready for lacing up to bind the sheets together and auxiliary covers adapted for positioning on said pillars, one of said auxiliary covers being placed adjacent to said back plate, an extension thereon, means to hold said extension temporarily to the file and said extension being adapted to engage the other auxiliary cover and the latter to be bound by the cord substantially as set forth.

9. In a file, a back cover, pillars mounted thereon, a binder comprising an auxiliary cover perforated at its edge to pass over said pillars, a flexible back attached at one end to said auxiliary cover, means for temporarily retaining said flexible back against said back cover, said flexible back being designed to be passed over said pillars and a second auxiliary cover also engaged on said pillars and to which said flexible back is adapted to be attached, whereby said parts may be bound together additionally in the form of a book as described.

In testimony whereof we affix our signatures in presence of two witnesses.

WILLIAM ELLISON McLEAN.
THOMAS CHARLES COULL.

Witnesses:
JOHN RUTHERFORD PARK,
CHARLES GILLESPIE DRUMMOND.